United States Patent
Van Steijn et al.

(10) Patent No.: US 9,642,377 B2
(45) Date of Patent: May 9, 2017

(54) CONVEYOR LINE AND CARRIER FOR POULTRY USED IN SAID CONVEYOR LINE

(71) Applicant: Meyn Food Processing Technology B.V., Oostzaan (NL)

(72) Inventors: Aloysius Christianus Maria Van Steijn, Oostzaan (NL); Eric Adriaan Van Hillo, Oostzaan (NL); Jan Willem Hagendoorn, Oostzaan (NL); Edgar Santiago Pina, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

(21) Appl. No.: 15/273,770

(22) Filed: Sep. 23, 2016

(65) Prior Publication Data
US 2017/0079293 A1  Mar. 23, 2017

(51) Int. Cl.
*A22C 25/12* (2006.01)
*A22C 21/00* (2006.01)

(52) U.S. Cl.
CPC ...... *A22C 21/0053* (2013.01); *A22C 21/0007* (2013.01)

(58) Field of Classification Search
CPC .. A22C 21/00; A22C 21/0007; A22C 21/0046
USPC .................................. 452/177–192
See application file for complete search history.

(56) References Cited

U.S. PATENT DOCUMENTS

| 5,092,815 A * | 3/1992 | Polkinghorne .... | A22C 21/0053 |
| | | | 452/153 |
| 6,017,269 A | 1/2000 | Altenpohl | |
| 6,179,701 B1 * | 1/2001 | Tieleman ........... | A22C 21/0053 |
| | | | 452/179 |
| 6,811,480 B2 * | 11/2004 | Moriarty ............ | A22C 21/0007 |
| | | | 452/179 |
| 6,830,508 B2 * | 12/2004 | Hazenbroek ....... | A22C 21/0007 |
| | | | 452/179 |
| 2002/0009967 A1 | 1/2002 | Visser | |
| 2002/0090905 A1 | 7/2002 | Moriarty | |
| 2004/0198209 A1 * | 10/2004 | Hazenbroek ....... | A22C 21/0007 |
| | | | 452/188 |
| 2005/0037705 A1 | 2/2005 | Beeksma | |

FOREIGN PATENT DOCUMENTS

| EP | 1440618 A1 | 7/2004 |
| WO | WO 2011/133028 A1 | 10/2011 |

* cited by examiner

*Primary Examiner* — Richard Price, Jr.
(74) *Attorney, Agent, or Firm* — Dority & Manning, P.A.

(57) ABSTRACT

A conveyor line and carrier including a hook or hooks for suspending poultry or poultry parts by the legs. A carriage for moving the carrier with the suspended poultry or poultry parts along a track of the conveyor line. Arranged with at least a first rotatable vertical rod suspended from the carriage, which first rotatable rod is provided with a sideways extending arm for adjusting an orientation of the poultry or poultry parts with reference to the carriage.

21 Claims, 5 Drawing Sheets

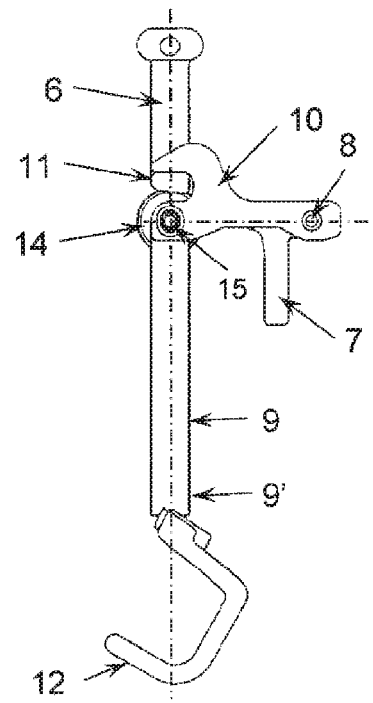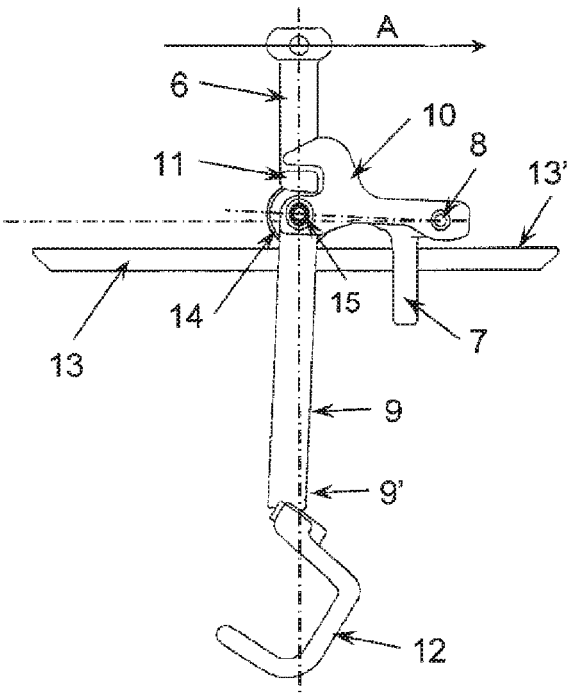
Fig.4　　　　Fig.5
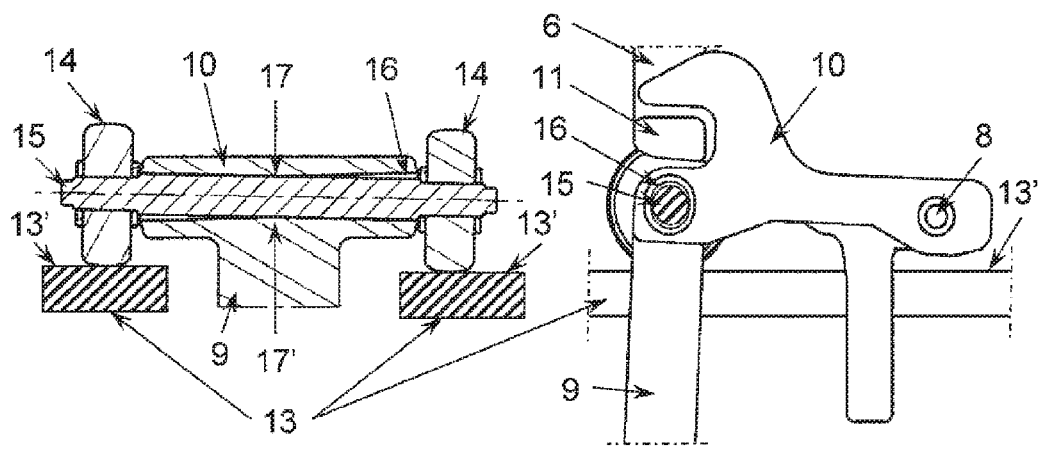
Fig.6

CONVEYOR LINE AND CARRIER FOR POULTRY USED IN SAID CONVEYOR LINE

PRIORITY STATEMENT

The present application claims priority under 35 U.S.C. §119 to Dutch Application No. 2015493, filed Sep. 23, 2015, and Dutch Application No. 2016596 filed on Apr. 13, 2016.

FIELD OF THE INVENTION

The subject matter of the present disclosure relates generally to a conveyor line and a carrier for poultry.

BACKGROUND OF THE INVENTION

A conveyor line and a carrier are known from the applicant's earlier application with U.S. Publication No. 2005/0037705.

In one exemplary aspect, an object of the present invention is to further develop this known conveyor line and carrier such that it is possible to measure the weight of the poultry or poultry part suspended in the carrier without sacrificing the possibility to engage the sideways extending arm provided on the rotatable rod for bypassing the poultry around processing means that may be positioned in the track of the conveyor line.

WO2011/133028 discloses a conveyor line with a poultry carrier and EP-A-1 440 618 discloses a poultry carrier for a conveyor line, wherein both documents disclose that the carrier has a carriage for moving the poultry along a track of a conveyor line, and wherein the carrier is embodied with hooks for suspending the poultry by the legs, and the carrier is arranged with at least a first rotatable vertical rod suspended from the carriage to enable rotation of the poultry. Both documents further disclose weighing means forming part of the carrier. However neither of these documents teaches, hints, suggests, or provides any rationale regarding how to combine the weighing facility of these devices with the facility that the poultry may be bypassed around a processing means in the track of the conveyor line. WO2011/133028 and EP-A-1 440 618 cannot for that purpose be amalgamated with U.S. Publication No. 2005/0037705 because the respective documents disclose inherently incompatible constructions. Furthermore the constructions of WO2011/133028 and EP-A-1 440 618 entail many components and are therefore costly, whilst hygiene is poor since the constructions are sensitive to accumulation of dirt and grease.

In another exemplary aspect, another object of the invention is to secure hygienic working conditions by an appropriate design of the conveyor line and carrier.

In another exemplar aspect, another object of the invention is to provide such a conveyor line and carrier with less components than used in the prior art and to reduce costs.

In still another exemplary aspect, another object of the invention is to reduce play and friction in relevant parts of the conveyor line and carrier.

One or more of these objects of the invention or others are achieved or at least promoted by the features of the conveyor line and carrier according to one or more of the appended claims.

SUMMARY OF THE INVENTION

In one exemplary embodiment, the invention relates to a conveyor line for poultry suspended by the legs provided with at least one carrier for the poultry, which carrier comprises a carriage for moving the poultry or poultry parts along a conveying direction of the conveyor line, wherein the carrier is arranged with at least a first rotatable vertical rod suspended from the carriage, which first rotatable rod is provided with a sideways extending arm for adjusting an orientation of the poultry or poultry parts with reference to the carriage that is movable in the conveyor line. In another exemplary embodiment, the invention also relates to a separate carrier which is intended to be used in such a conveyor line. Aspects and advantages of the invention will be set forth in part in the following description, or may be obvious from the description, or may be learned through practice of the invention.

According to a first exemplary aspect of the invention, the carrier and the conveyor line in which such carrier is applied, have the feature that near or at the sideways extending arm a frame is provided that is movable up and down with reference to the first vertical rod. A second rod is suspended from the frame. The movability of the frame causes that the second rod is movable up and down while the first rod maintains its altitude. A hook or hooks for suspending the poultry are provided at a lower end of the second rod. This makes possible that the frame with the second rod can be lifted and its suspension from the first rod can be interrupted to enable accurate measurement of the weight of the poultry attached to the hook or hooks at the lower end of the second rod.

In an exemplary embodiment wherein the frame is embodied as a second carriage, the point where the second rod is suspended from the first rod is precisely defined by arranging that the first rod and/or the sideways extending arm restrict downward movement of the frame below a predefined position.

Suitably for that purpose the first rod can be provided with a stop or stops to restrict downward movement of the frame beyond a point where the stop is or stops are operational.

Different embodiments for the frame embodied as a carriage with capability to be movable up and down are feasible. In one preferred exemplary embodiment, the second carriage has wheelsets in front and in rear, wherein an axle of the rear wheel set is guided through a channel of the sideways extending arm at a position distant from the first vertical rod, and wherein the channel provides room for up and down movement of the axle.

In another exemplary embodiment, at a position distant from the first rod, the arm is provided with a hinge to which the second rod pivotably connects by means of the frame that extends sideways from the second rod. The second rod substantially extends in the longitudinal direction of the first rod when the downward movement of the frame is restricted by the stop or stops. This alternative construction also enables that the frame is lifted (albeit that it is then pivoted around the hinge) to accurately measure the weight of the poultry attached to the hook or hooks at the lower end of the second rod.

Accuracy of the measurement is promoted by arranging symmetry in the construction in that the frame is provided with two legs extending from the hinge towards the first rod on opposite sides of the arm of the first rotatable rod. Preferably, in another exemplary aspect, each leg of the frame abuts a stop when the second rod extends in the longitudinal direction of the first rod.

Accuracy of the measurement is further promoted by arranging that the frame is provided with a supporting wheel or wheels in another exemplary aspect. The wheel or wheels are arranged to cooperate with supporting surfaces of weighing scales provided in the conveyor line. One of the advantages of the invention is that this construction avoids that frictional forces have a major impact on the accuracy of the weight measurement.

It is possible to fix the second rod to the frame. For accuracy reasons, however, it may be beneficial that the second rod is pivotably connected to the frame at the location near to an axle of the wheel or wheels. The second rod can then always assume an exact vertical orientation, also when the frame is obliquely lifted from the stop or stops of the first rod.

Still further improvement of the accuracy of the weight measurement is possible in an exemplary construction wherein the frame has wheels on opposite sides, and the feature is applied that the wheels of each wheelset are mounted on an axle passing through a shaft or bore in the frame. The shaft or bore has convex bottom and top surfaces. This enables that the wheels on opposite sides of the frame have room to move to a slightly different level with respect to each other to match the possibly different levels of the supporting surfaces of the weighing scales placed on opposite sides of the track of the conveyor line.

It is preferable than that the bottom and top surfaces of the shaft or bore each have an apex at the shaft's center coinciding with a longitudinal body axis of the second rod in order to provide for perfect symmetry.

The invention will hereinafter be further elucidated with reference to drawings of an exemplary embodiment of an apparatus according to the invention that is not limiting as to the appended claims. Other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 4 and FIG. 5 show a first detail of the carrier of the first exemplary embodiment of the invention in different positions;

FIG. 6 shows a second detail of the carrier of an exemplary embodiment of the invention in a cross-sectional view and in a side view.

The use of identical or similar reference numerals in different figures denotes identical or similar features.

DETAILED DESCRIPTION OF THE INVENTION

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

Figure 1:
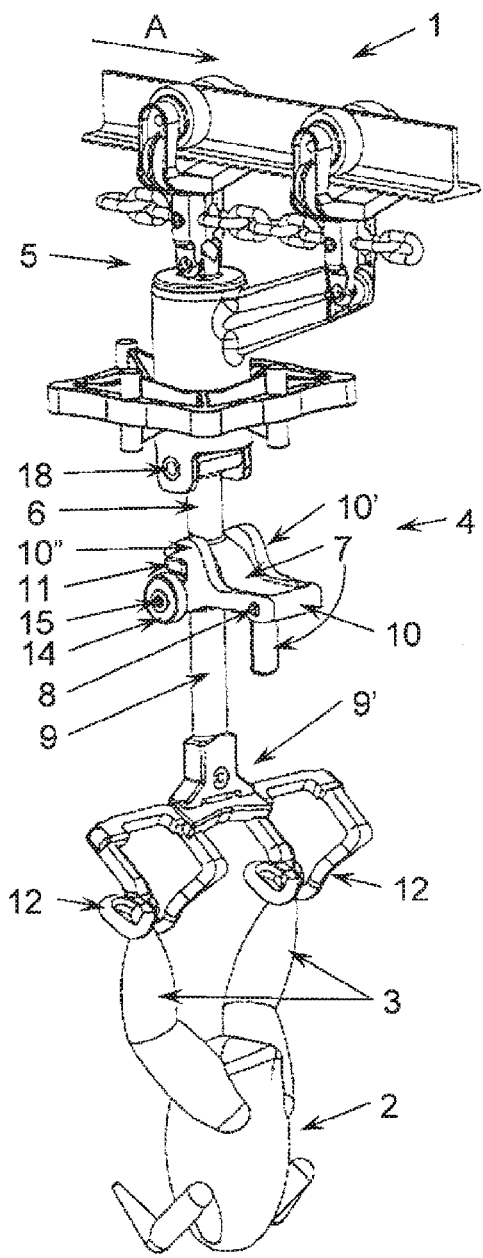
FIG. 1 shows a carrier and part of a conveyor line according to a first exemplary embodiment of the invention in isometric view.
Figure 2:
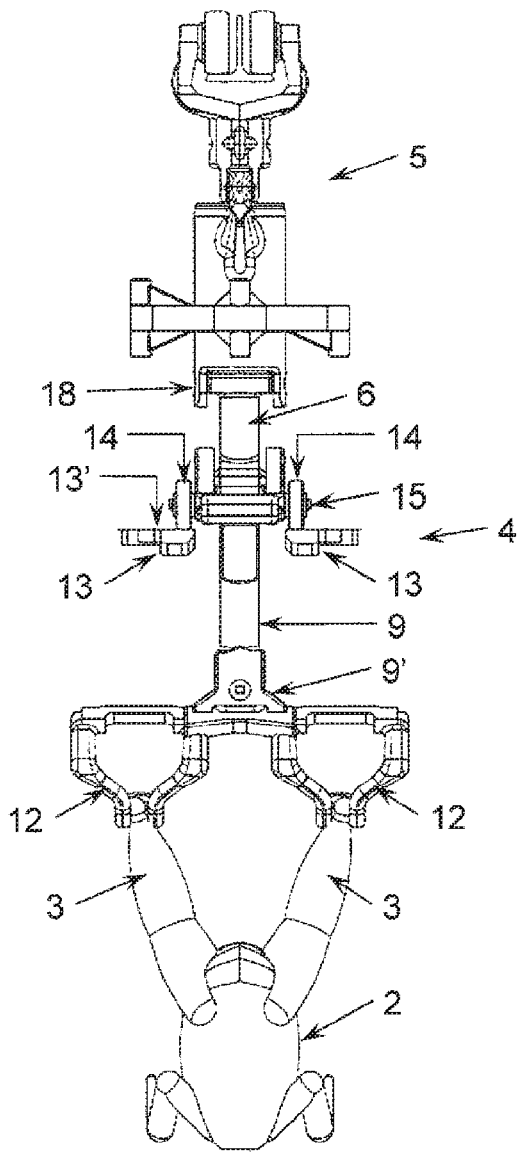
FIG. 2 shows a carrier and part of a conveyor line according to the first exemplary embodiment of the invention in a frontal view.
Figure 3:
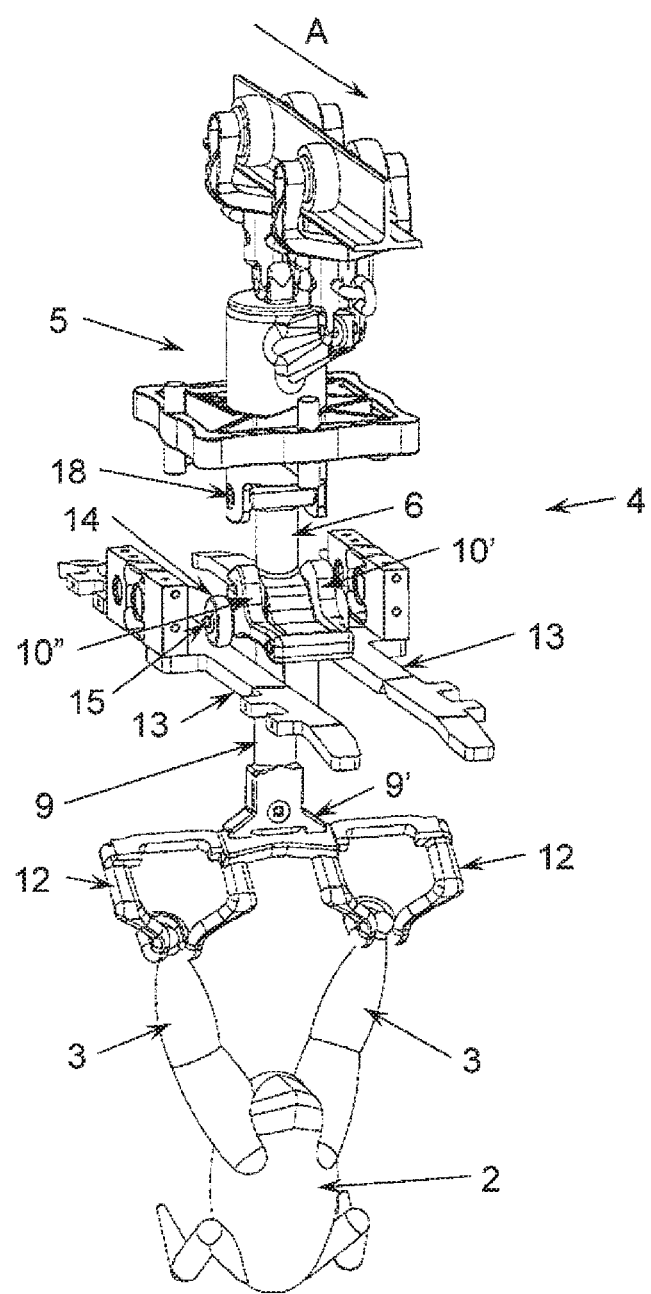
FIG. 3 shows in isometric view a carrier and part of a conveyor line at the location of the weighing scales of the conveyor line according to the first exemplary embodiment of the invention.

With reference to FIGS. 1, 2 and 3, an exemplary conveyor line 1 for poultry 2 suspended by the legs 3 is shown, which is provided with at least one carrier 4 for the poultry 2. The carrier 4 includes a carriage 5 for moving the poultry 2 or poultry parts along a conveying direction of the conveyor line 1, as indicated with arrow A in FIG. 1 and FIG. 3. The carrier 4 is arranged with a rotatable vertical rod 6 pivotably suspended from the carriage 5 at hinge 18, and this rotatable rod 6 is provided with a sideways extending arm 7 for adjusting an orientation of the poultry 2 or poultry parts with reference to the carriage 5 that is movable in the conveyor line 1. The sideways extending arm 7 can be used for moving the poultry 2 aside and away from the conveying track of the conveyor line 1 to bypass processing means positioned in the track of the conveyor line 1. Such is consistent with U.S. Pub. No. 2005/0037705.

In a first exemplary embodiment of the invention depicted in FIGS. 1-5, the arm 7 is at a position distant from the first rod 6 provided with a hinge 8, wherein a second rod 9 pivotably connects to the hinge 8 by means of a frame 10 that side-ways extends from the second rod 9. This can particularly be seen in FIG. 4 and FIG. 5.

FIGS. 4 and 5 further provide a clear picture on the feature that the first rod 6 is provided with a stop 11 or stops for the frame 10 that prevents that the frame 10 and the second rod 9 connected thereto swing to a position below the stop 11. Accordingly, FIG. 4 shows that this feature arranges that the frame 10 comes to rest on the stops 11 so that when the frame 10 abuts against the stop 11 or stops the second rod 9 substantially extends in the longitudinal direction of the first rod 6. The figures further show that the hook or hooks 12 for suspending the poultry 2 are provided at a lower end 9' of the second rod 9.

FIG. 5 shows that this construction enables that the frame 10 is lifted from the stop 11 or stops of the first rod 6, which enables an accurate measurement of the weight of the poultry 2 attached to the hook or hooks 12 at the lower end 9' of the second rod 9. Making reference to both FIG. 3 and FIG. 5, the weight measurement is preferably carried out with weighing scales 13 placed in or next to the track of the conveyor line 1, wherein the frame 10 is at least provided with a supporting wheel or wheels 14 adjacent to the second rod 9 that are arranged to cooperate with the supporting surfaces 13' of the weighing scales 13. Accordingly, the wheels 14 transfer the load of the poultry 2 suspended by the legs 3 in the hooks 12 of the carrier 4 directly on the top surface 13' of the weighing scales 13.

Different features as discussed hereinafter can further promote the accuracy of the weight measurement.

In one preferred exemplary embodiment, a symmetric load distribution is promoted by arranging that the frame 10 has two legs 10' and 10" extending from the hinge 8 towards the first rod 6 on opposite sides of the arm 7 extending sideways from the first rotatable rod 6. This is clearly shown in FIG. 1 and FIG. 3. In that situation, it is also preferred that each leg 10', 10" of the frame 10 abuts a stop 11 when the second rod 9 extends in the longitudinal direction of the first rod 6.

In another exemplary aspect which can be applied in combination with the just mentioned feature, the second rod 9 is pivotably connected to the frame 10 at the location of an axle 15 of the wheel or wheels 14. This is not shown in FIGS. 4 and 5, which figures show the embodiment in which there is a fixed connection between the second rod 9 and the frame 10, which arranges for a slight angular displacement of the rod 9 when the frame 10 is lifted from the stops 11 provided on the first rod 6. When the second rod 9 is pivotably connected to the frame 10 at the location of the axle 15 of the wheel or wheels 14, this provides the advantage that the second rod 9 can then always assume an exact vertical orientation when the frame 10 is lifted from the stop 11 or stops of the first rod 6.

Figure 7:
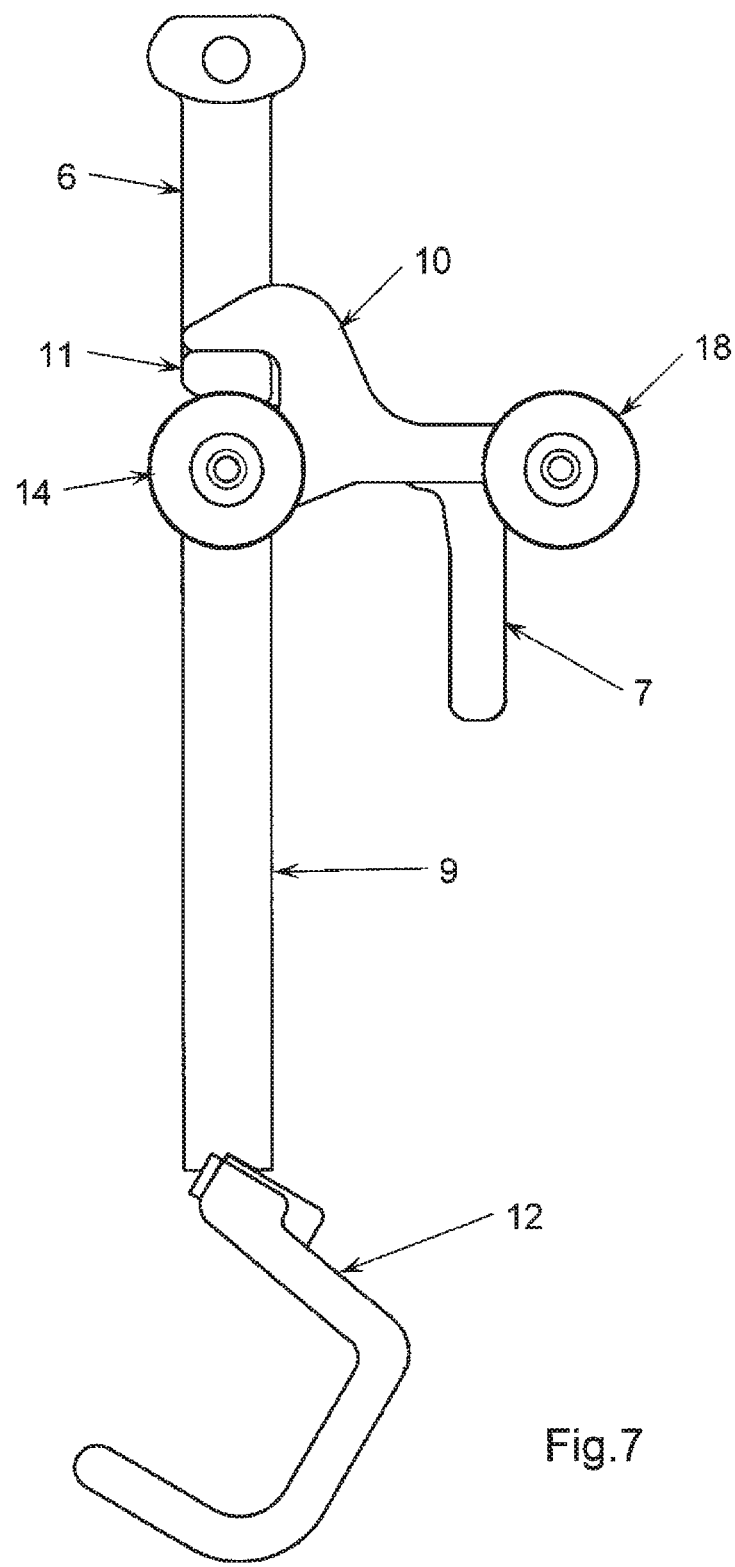
FIG. 7 and FIG. 8 show a side view and an isometric view of a detail of a carrier according to a second exemplary embodiment of the invention.
Figure 8:
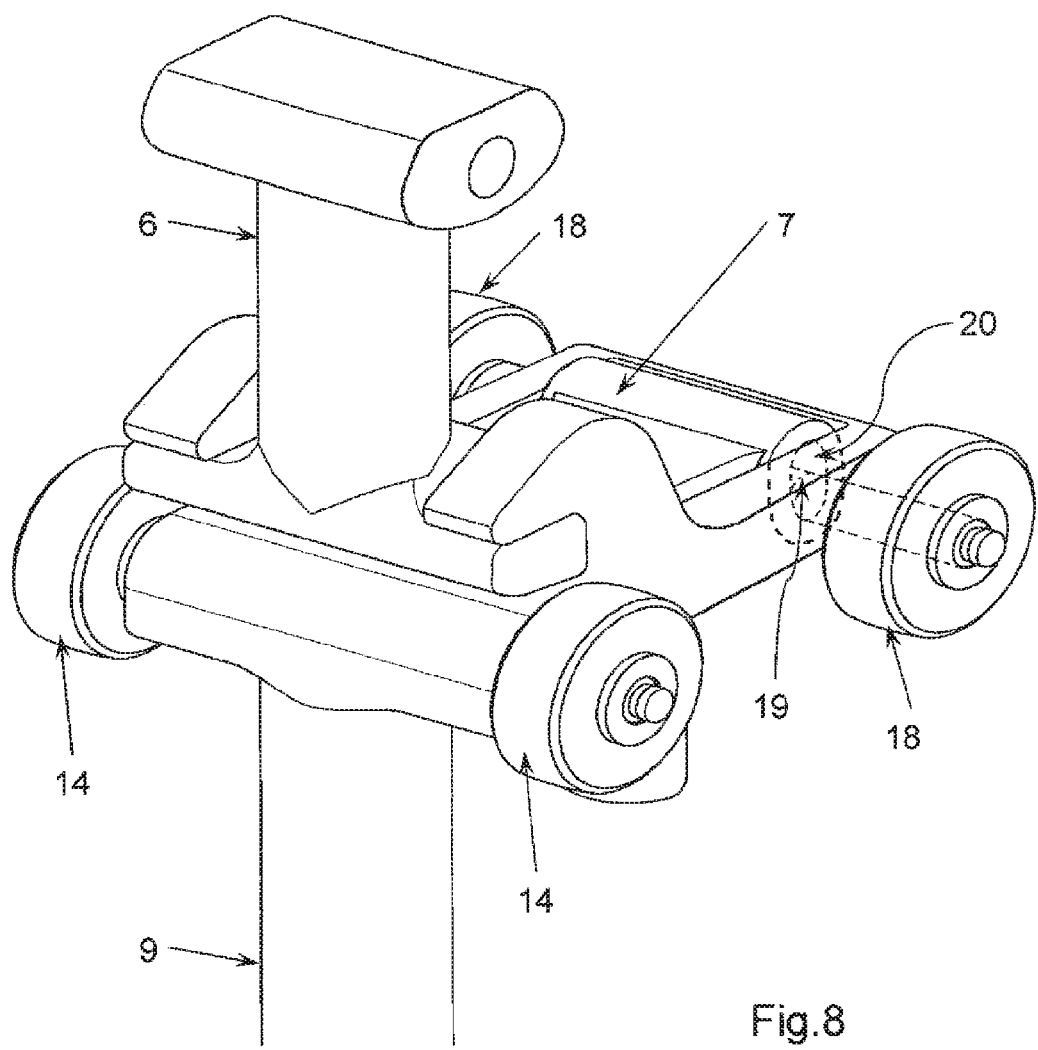

In another exemplary embodiment shown in FIGS. 7 and 8, which secures very accurate measurement of the weight of the poultry suspended by the legs in the hooks 12 down the second rod 9, the hinge 8 at the far end of the first vertical rod 6 as shown in FIGS. 1 through 5 is avoided. Instead, FIG. 7 and FIG. 8 show an alternative solution wherein the frame 10 is embodied as a second carriage, and wherein the first rod 6 and/or the sideways extending arm 7 are arranged to restrict downward movement of the entire frame 10 below a predefined position. Also in this embodiment the first rod 6 can be provided with a stop 11 or stops to restrict downward movement of the frame/carriage 10 beyond a point where the stop 11 is or stops are operational.

In this second embodiment, the frame 10 or carriage has wheelsets both in front and in rear, wherein an axle 19 of the rear wheel set 18 is guided through a channel 20 of the sideways extending arm 7 at a position distant from the first vertical rod 6, wherein the channel 20 provides room for up and down movement of the axle 19.

The accurate measurement which is enabled in both the first embodiment shown in FIGS. 1-5 and in the second embodiment of FIGS. 7 and 8, is due to the common feature of these embodiments that near or at the sideways extending arm 7 the frame 10 is movable up and down with reference to the first vertical rod 6, wherein the second rod 9 is suspended from the frame 10, and wherein the movability of the frame 10 causes that the second rod 9 is movable up and down whilst the first rod 6 maintains its altitude. Evidently in both embodiments the hook or hooks 12 for suspending the poultry 2 are provided at the lower end 9' of the second rod 9.

In exemplary embodiments, it is preferred that there are wheels 14 on opposite sides of the frame 10 and preferably adjacent to the second rod 9, wherein the wheels 14 are mounted on an axle 15 passing through a shaft or bore 16 in the frame 10. A beneficiary feature is that the shaft or bore 16 has convex bottom and top surfaces. The bottom and top surfaces of the shaft or bore preferably each have an apex 17, 17' at the center of the shaft or bore 16 coinciding with a longitudinal body axis of the second rod 9. This enables that the wheels 14 on opposite sides of the frame 10 have room to move to a slightly different level with respect to each other, to match possibly different levels of the supporting surfaces 13' of the weighing scales 13 placed on opposite sides of the track of the conveyor line. This further promotes the accuracy of the weight measurement. Although it is not shown in FIG. 6 which relates to the first embodiment of FIGS. 1-5, this applies likewise to the axles and wheels in the front and rear of the frame/carriage 10 as shown in FIGS. 7 and 8.

Although the invention has been discussed in the foregoing with reference to an exemplary embodiment of the carrier and conveyor line of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

What is claimed is:

1. A poultry carrier, comprising:
a hook or hooks for suspending poultry or poultry parts by the legs;
a carriage for moving the carrier with the suspended poultry or poultry parts along a track of a conveyor line, with the carriage is arranged with at least a first rotatable vertical rod suspended from the carriage, the first rotatable rod provided with a sideways extending arm for adjusting an orientation of the poultry or poultry parts with reference to the carriage;
wherein near or at the sideways extending arm a frame is provided which is movable up and down with reference to the first vertical rod, wherein a second rod is suspended from the frame, and wherein the movability of the frame causes that the second rod is movable up and down while the first rod maintains its altitude, and wherein the hook or hooks for suspending the poultry are provided at a lower end of the second rod.

2. The carrier according to claim 1, wherein the frame is embodied as a second carriage, and wherein the first rod, the sideways extending arm, or both, are arranged to restrict downward movement of the frame below a predefined position.

3. The carrier according to claim 2, wherein the first rod is provided with a stop or stops to restrict downward movement of the frame beyond a point where the stop or stops are operational.

4. The carrier according to claim 3, wherein the second carriage has wheelsets in front and in rear, wherein an axle of the rear wheelset is guided through a channel in the side-ways extending arm at a position distant from the first vertical rod, wherein the channel provides room for up and down movement of the axle.

5. The carrier according to claim 3, wherein at a position distant from the first rod, the arm is provided with a hinge, wherein the second rod pivotably connects to the hinge by way of the frame that extends sideways from the second rod, and wherein the second rod substantially extends in the longitudinal direction of the first rod when downward movement of the frame is restricted by the stop or stops.

6. The carrier according to claim 5, wherein the frame comprises two legs extending on opposite sides of the arm that sideways extends from the first rotatable rod.

7. The carrier according to claim 5, wherein each leg of the frame abuts a stop when the second rod extends in the longitudinal direction of the first rod.

8. The carrier according to claim 6, wherein the frame (10) is provided with a supporting wheel or wheels adjacent to the second rod as a front wheelset, and the second rod is pivotably connected to the frame at an axle of the wheel or wheels.

9. The carrier according to claim 8, further comprising wheels on opposite sides of the second rod, wherein the wheels are mounted on the axle passing through a shaft or bore in the frame, which shaft or bore has convex bottom and top surfaces.

10. The carrier according to claim 9, wherein the bottom and top surfaces of the shaft or bore each have an apex at the shaft's center coinciding with a longitudinal body axis of the second rod.

11. A conveyor line for poultry suspended by the legs, comprising:
a carrier for the poultry, the carrier comprising a carriage for moving the poultry or poultry parts along a conveying direction of the conveyor line, wherein the carrier is arranged with at least a first rotatable vertical rod suspended from the carriage, which first rotatable rod is provided with a sideways extending arm for adjusting an orientation of the poultry or poultry parts with reference to the carriage that is movable in the conveyor line;
wherein near or at the sideways extending arm a frame is provided which is movable up and down with reference to the first vertical rod, wherein a second rod is suspended from the frame, and wherein the movability of the frame causes that the second rod is movable up and down whilst the first rod maintains its altitude, and wherein the hook or hooks for suspending the poultry are provided at a lower end of the second rod.

12. The conveyor line for poultry as in claim 11, wherein the frame is embodied as a second carriage, and wherein the first rod, sideways extending arm, or both are arranged to restrict downward movement of the frame below a predefined position.

13. The conveyor line for poultry as in claim 12, wherein the first rod is provided with a stop or stops to restrict downward movement of the frame beyond a point where the stop or stops are operational.

14. The conveyor line for poultry as in claim 13, wherein the second carriage comprises wheelsets in front and in rear, wherein an axle of the rear wheelset is guided through a channel of the sideways extending arm at a position distant from the first vertical rod, wherein the channel provides room for up and down movement of the axle.

15. The conveyor line for poultry as in claim 13, wherein at a position distant from the first rod, the arm is provided with a hinge, wherein the second rod pivotably connects to the hinge by way of the frame that extends sideways from the second rod, and wherein the second rod substantially extends in the longitudinal direction of the first rod when downward movement of the frame is restricted by the stop or stops.

16. The conveyor line for poultry as in claim 15, wherein the frame comprises two legs extending on opposite sides of the arm that sideways extends from the first rotatable rod.

17. The conveyor line for poultry as in claim 16, wherein each leg of the frame abuts a stop when the second rod extends in the longitudinal direction of the first rod.

18. The conveyor line for poultry as in claim 17, further comprising weighing scales, wherein the frame is provided with a supporting wheel or wheels that are arranged to cooperate with supporting surfaces of the weighing scales.

19. The conveyor line for poultry as in claim 18, wherein the second rod is pivotably connected to the frame at the location of an axle of the wheel or wheels.

20. The conveyor line for poultry as in claim 18, further comprising wheels are provided on opposite sides of the second rod, wherein the wheels are mounted on the axle passing through a shaft or bore in the frame, which shaft or bore has convex bottom and top surfaces.

21. The conveyor line for poultry as in claim 20, wherein the bottom and top surfaces of the shaft or bore each have an apex at the shaft's center coinciding with a longitudinal body axis of the second rod.

* * * * *